United States Patent [19]
Horner et al.

[11] Patent Number: 5,133,180
[45] Date of Patent: Jul. 28, 1992

[54] CHEMICALLY RECUPERATED GAS TURBINE

[75] Inventors: Michael W. Horner, West Chester; William R. Hines, Cincinnati, both of Ohio

[73] Assignee: General Electric Company, Cincinnati, Ohio

[21] Appl. No.: 632,657

[22] Filed: Dec. 27, 1990

Related U.S. Application Data

[63] Continuation of Ser. No. 339,848, Apr. 18, 1989, abandoned.

[51] Int. Cl.$^5$ .............................................. F02C 3/28
[52] U.S. Cl. ................................... 60/39.12; 60/39.53
[58] Field of Search ............... 60/39.07, 39.12, 39.53, 60/736, 39.511

[56] References Cited

U.S. PATENT DOCUMENTS

| | | | |
|---|---|---|---|
| 3,167,913 | 2/1965 | Muhlberg et al. | 60/39.53 |
| 3,334,486 | 8/1967 | Scholz | 60/736 |
| 3,895,488 | 7/1975 | Koch | 60/39.511 |
| 4,743,516 | 5/1988 | Noguchi et al. | 429/16 |

FOREIGN PATENT DOCUMENTS

| | | |
|---|---|---|
| 2577990 | 2/1985 | France . |
| 1138165 | 12/1968 | United Kingdom . |
| 1442367 | 7/1976 | United Kingdom . |
| 1561294 | 2/1980 | United Kingdom . |
| 1581334 | 12/1980 | United Kingdom . |
| 2091755 | 8/1982 | United Kingdom . |

OTHER PUBLICATIONS

Advanced Chemically Recuperated Gas Turbine Cycle Evaluation Project—Preliminary Assessment of the System Concept—Program Final Report (Rev. #1) (GE); Dec. 2, 1988.

*Primary Examiner*—Louis J. Casaregola
*Attorney, Agent, or Firm*—Jerome C. Squillaro; James P. Davidson

[57] ABSTRACT

A powerplant comprising a compressor for producing a downstream fluid flow, a combustor downstream of the compressor, a turbine downstream of the combustor, a power turbine downstream and adjacent the turbine, and a duct region which receives at least a portion of the fluid output of the power turbine. A reformer is positioned downstream and is coupled to the duct region and the reformer has a fuel outlet which is coupled to the combustor.

21 Claims, 5 Drawing Sheets

CHEMICALLY RECUPERATED GAS TURBINE

This application is a continuation of application Ser. No. 07/339,848, filed Apr. 18, 1989 (abandoned).

The invention relates to powerplants and, more particularly, to chemical recuperation using steam to produce a fuel having significant quantities of hydrogen and water vapor which is injected into a gas turbine engine to increase performance and to produce low emissions.

BACKGROUND OF THE INVENTION

Gas turbine engines are used for a variety of purposes including electric utility and industrial powerplant applications. Governmental regulations have been implemented which limit powerplant emissions of particles such as nitrous oxide (NOx) and carbon monoxide (CO). In efforts to reduce NOx emissions, powerplants have incorporated engines which inject steam or water into the engine's combustor. Injecting steam into the combustor reduces the temperature to which air is heated by the combustion of fuel. NOx emissions are significantly reduced by steam injection since NOx emissions decrease as flame temperatures decrease. Unfortunately, as the lowest NOx levels are obtained it has been found that carbon monoxide emissions significantly increase.

One powerplant system for obtaining low NOx and CO emissions is selective catalytic reduction (SCR). However, this system requires significant capital and operating expenses and this system also unfortunately involves the commercial transportation of ammonia which is both hazardous and relatively expensive.

Reformers or chemical recuperators transform fuels such as natural gas into high hydrogen content streams for use in producing ammonia or for use in refinery processes requiring hydrogen. These reformers may incorporate heating systems which use fire-brick which heat the reformer by convection and radiation. However, these fire-brick systems are typically expensive and operate at much higher temperatures than desired for incorporation with gas turbines.

The combining of gas turbine engine technology, and in particular aircraft derivative engines, with reformers has typically been considered impractical based on cost, efficiency and design considerations. In one suggested advanced powerplant, described as a reheat intercooled steam injected gas turbine engine, low and high pressure compressors in a gas turbine engine produce a downstream fluid flow and an intercooler is positioned between the compressors. The fluid flow passes through a combustor which heats the fluid and then the fluid flow passes through high and low pressure turbines which drive the compressors. A reheat combustor is positioned downstream of the low pressure turbine for further heating of the fluid flow. The flow then passes through a power turbine and the output flow from the power turbine provides heat for a reformer. The reformer receives water which is heated by the intercooler and the reformer also receives methane which is heated by a fuel heater which uses the intercooler's heated water. The reformer produces a reformed fuel which is supplied to both the first combustor and the reheat combustor. Steam from a boiler is also injected into the turbine for cooling. While this system may be capable of producing low NOx and CO emissions, this system is unfortunately complex. For example, the exhaust from the power turbine which heats the reformer typically must be at least about 1150 to 1250 degrees Fahrenheit and generally must be about 1200 to 1800 degrees Fahrenheit. However, the exhaust from a gas turbine engine is typically only about 900 degrees Fahrenheit. Therefore, the reheat combustor must produce a fluid flow whose temperature is in excess of these temperatures and the power turbine must be designed to withstand these types of temperatures. However, reheat combustors have not generally been incorporated in gas turbine configurations and therefore design, development and their associated expenses are required in reheat combustor development. Further, power turbines are generally not currently capable of withstanding these temperatures and thus redesign and replacement is necessary with turbines incorporating advanced cooling techniques, therefore resulting in increased expense. Further, the intercooler and fuel heater which provide heated inputs into the reformer also result in increased design complexity and expense and provide increased difficulties in modifying existing systems.

Therefore, it would be desirable to have a gas turbine powerplant with reduce NOx and CO emissions which is capable of producing and utilizing reformed fuel and which may be adapted to current systems without significant design modifications and expense which preferably eliminates the use of extremely high temperature power turbines.

SUMMARY OF THE INVENTION

A Powerplant comprising a gas turbine engine having a compressor for producing a downstream fluid flow, a combustor downstream of the compressor, a turbine downstream of the combustor, and a power turbine downstream and adjacent the turbine. A reformer is positioned downstream of the power turbine such that the output of the power turbine provides a first means for heating the reformer and the reformer has an output which is coupled to the combustor.

The invention also includes a powerplant comprising a compressor for producing a downstream fluid flow, a combustor downstream of the compressor, a turbine downstream of the combustor and a duct region which receives at least a portion of the fluid output of the turbine. A burner is positioned within the duct region and a reformer is positioned downstream and coupled to the duct region. The reformer has an output which is coupled to the combustor.

Further, the invention includes a method of operating a powerplant having a compressor for producing a downstream fluid flow, a combustor downstream of the compressor, a turbine downstream of the combustor, a power turbine downstream and adjacent the turbine, and a reformer positioned downstream of the power turbine. The method comprises the steps of heating the fluid flow immediately prior to the reformer, injecting a fuel into an input of the reformer, and injecting at least a portion of the output of the reformer into the combustor

DETAILED DESCRIPTION OF PREFERRED EMBODIMENTS

Figure 1:
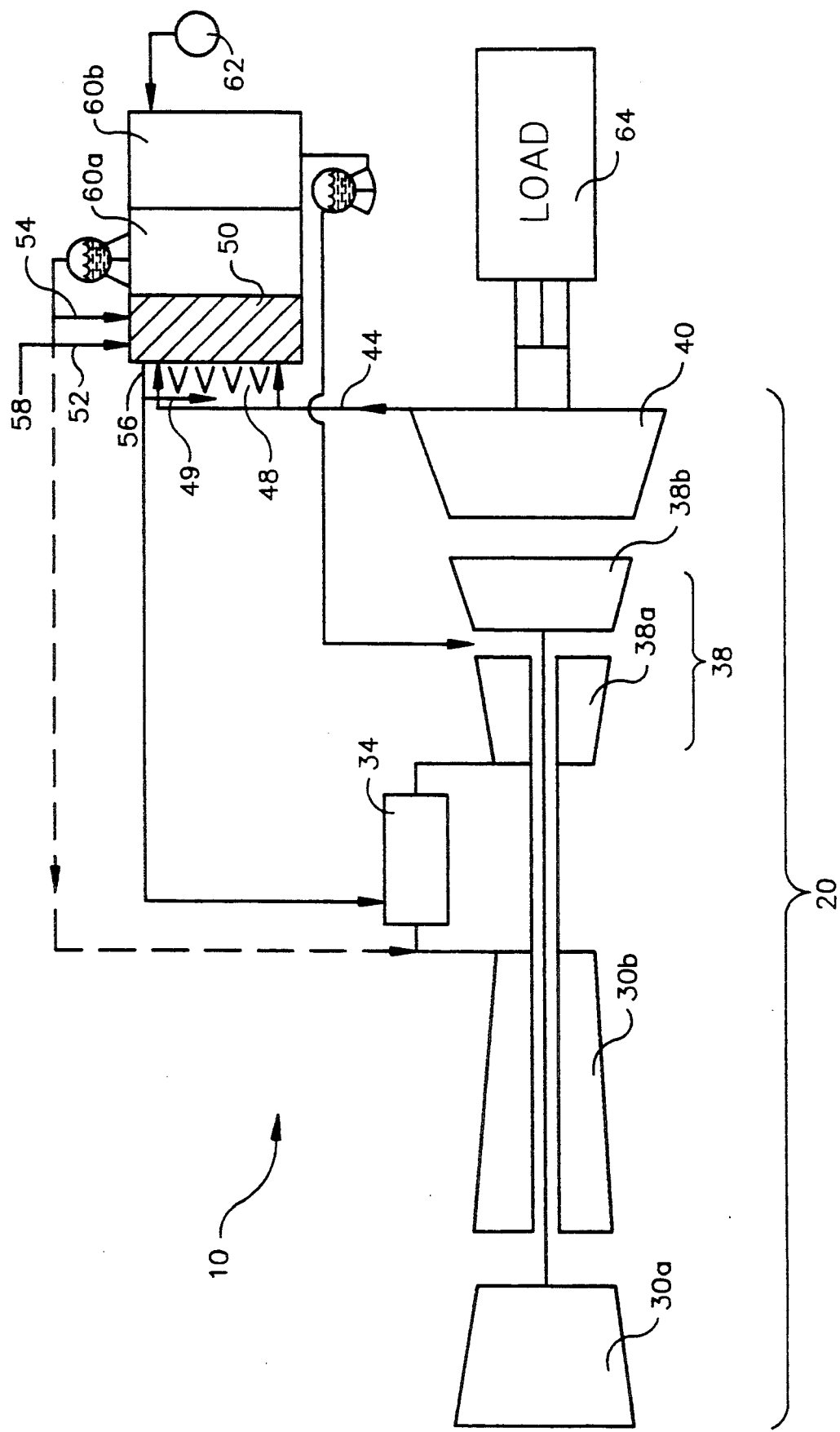
FIG. 1 is a schematic diagram of one embodiment of the invention.

In FIG. 1, a powerplant 10 of the present invention comprises an engine 20 having a compressor 30, such as a low pressure compressor 30a and a high pressure compressor 30b for producing a downstream flow, a combustor 34 positioned downstream of the compressor 30, a turbine 38 such as a high pressure turbine 38a drivingly connected to the high pressure compressor 30b and a low pressure turbine 38b drivingly connected to the low pressure compressor 30a. A free power turbine 40 is positioned downstream and is aerodynamically coupled and is positioned adjacent to the turbine 38, such that a heating means, such as a reheat combustor, is not positioned between the turbine 38 and the power turbine 40. At least a portion of the fluid or air output of the power turbine 40 is coupled through a duct 44 to a burner 48 having a fuel inlet 49. The burner 48 is thermodynamically coupled to a reformer 50 having first and second input means, 52 and 54 respectively and a reformed fuel outlet 56. A means for supplying fuel 58 is coupled to the first input means 52. A means for supplying steam 60 has a water inlet 62 and the means for supplying steam 60 typically comprises a high pressure boiler 60a and a low pressure boiler 60b. The steam supply means 60 is typically positioned downstream of the reformer 50 and has an outlet which is coupled to the second input means 54. The means for supplying steam 60 is also typically coupled to the combustor 34 and the turbine 38 and the reformed fuel outlet 56 is also coupled to the combustor 34.

The compressor 30, combustor 34 and turbine 38 may be of any type used for powerplants. Typically, these components are derived from those utilized in aircraft engines. The power turbine 40 is typically formed of standard materials and is typically coupled to a load 64 such as a generator or other device from which power may be extracted. The free wheeling power turbine can run at synchronous speeds of 3600 or 3000 revolutions per minute (rpm) to give 60 Hertz and 50 Hertz electricity, respectively. The duct 44 may be any type of duct or means to transport at least a portion or all of the air from the turbine 38 to the reformer 50. The duct 44 by transporting the heated engine fluid flowpath to the reformer 50 thereby serves as a first means for heating the reformer 50. The burner 48 serves as a second means for heating the reformer 50. The fuel inlet 49 of the burner 48 may receive any suitable fuel for burning. Typically, the fuel inlet 49 will be coupled to the reformed fuel outlet 56 of the reformer 50. However, performance improvements will be obtained in which all of the reformed fuel is injected into the combustor 34 and the fuel inlet 49 of the burner 48 is coupled to an alternative fuel supply. These performance improvements are obtained since the water vapor in the reformed fuel passes through all of the turbines and the power turbine resulting in increased power output and this system also allows for a simple burner design since the reformed fuel in the combustor has significantly reduced emissions. Alternatively, the fuel inlet 49 of the burner 48 may be coupled to a natural gas or a methane external supply. It should be understood that since the burner is downstream of the power turbine and therefore operating at relatively low pressures, only a small amount of undesirable emissions will be formed by this burner. Further, simple designs may be utilized when the reformed fuel is coupled to the combustor 34 as the emissions produced by the reformed fuel will have been significantly reduced. If further reductions in CO emissions are desired the reformed fuel may also be supplied to the burner 48. However, alternative burner designs well known in the art may be equally applicable. For example, a simple burner, such as formed through an array of individual burners, may be utilized when reformed fuel is supplied to the burner 48. The reformer 50 is preferably a reformer which utilizes methane, or any other carbohydrate fuel, and typically water or steam to produce a reformed fuel and is typically formed of stainless steel, as is well known in the art. In order to produce reformed fuel these reformers typically require heating to greater than 1100 degrees and typically between about 1200 to 1800 degrees Fahrenheit. Therefore, the amount of heat supplied to the burner is based on both the required reaction temperature of the reformer to produce a fuel with the desired constituents and also the temperature of the fluid which exits the power turbine which is typically about 900 degrees Fahrenheit. It should be understood that alternative reformer designs which may incorporate different configurations or catalysts such as a super-activated nickel catalyst may reduce the required reaction temperature. Therefore, as the required reaction temperature of the reformer is reduced, the heat supplied by the burner 48 may be reduced. Preferably, the heat supplied by the burner may be reduced to about zero, however, typically the burner will raise the temperature of the fluid exiting the turbine between about 250 and 600 degrees Fahrenheit. The high and low pressure boilers 60a and 60b respectively, may be any type of boilers well known in the art. The output of the high pressure boiler 60a is typically coupled to the reformer 50 for the reforming process and the steam may also be injected into the combustor 34 such that a portion of the steam is injected around the combustor 34 for cooling. Steam which is preferably about 50 degrees Fahrenheit above saturation temperature exiting from the high pressure boiler 60a also is typically coupled to the high pressure turbine 38a for cooling turbine blades and vanes. Steam from the low pressure boiler 60b also is typically coupled to the low pressure turbine 38 for cooling and for steam injection. The steam from the means for supplying steam 60 provides not only steam for NOx suppression and cooling but also provides increased mass flow for increased power output, excess steam may also be used for external processes.

Figure 2:
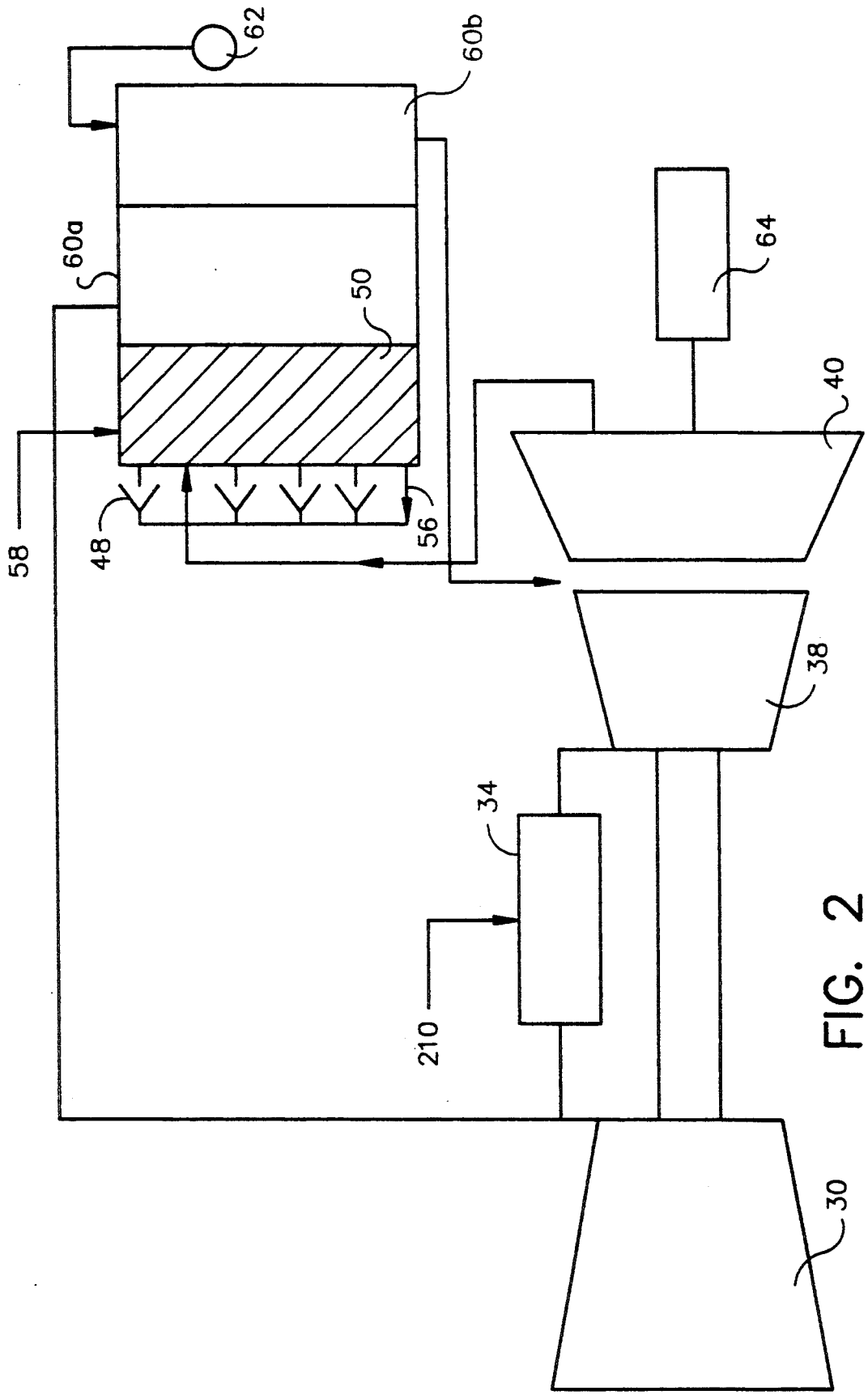
FIGS. 2 through 5 are schematic diagrams of alternative embodiments of the present invention.

In FIGS. 2 through 5 other embodiment of the present invention are depicted wherein like numerals correspond to like elements. In FIG. 2 an engine having a single compressor 30 and a single turbine 38 is depicted and a means for supplying non-reformed fuel 210 is coupled to the combustor 34 and the reformed fuel outlet is coupled to the burner 48. This system significantly reduces the required reformer size while reducing CO emissions through the burning of the air or fluid exhausted from the power turbine 40 and reducing NOx through steam injection in the combustor 34. Further in engines in which reformed fuel may significantly alter the operating line of the engine such as by increasing the high pressure compressor operating line beyond its desired operating point, this system can continue to use standard fuel in the combustor 34 thereby minimizing any change to current engines while controlling emissions.

Figure 3:
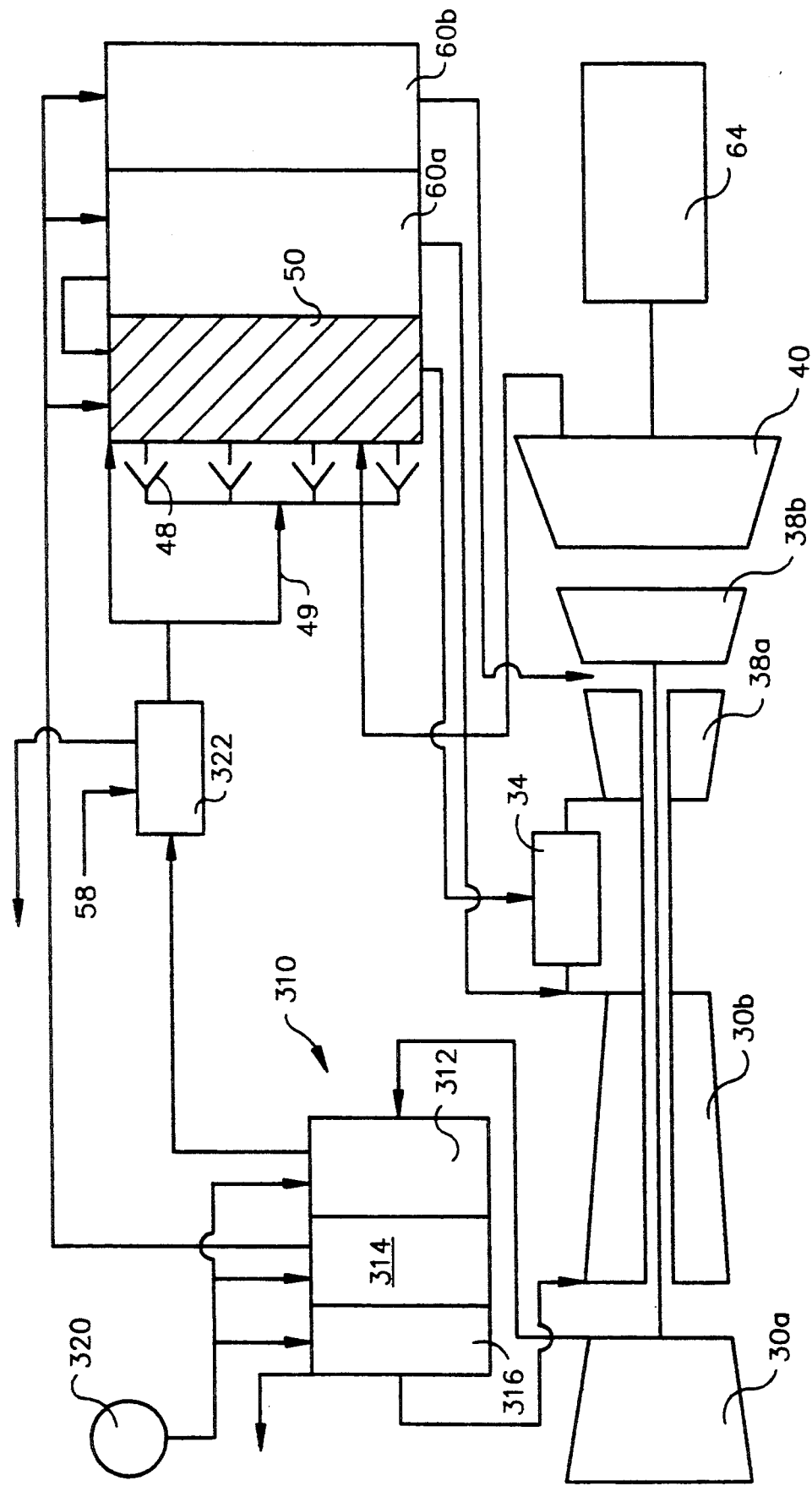

In FIG. 3 an intercooler 310 is positioned between the flowpath of the low and high pressure compressors, 30a and 30b respectively. The intercooler 310 has a fuel water heater 312, a feedwater heater 314, and a final intercooler stage 316, which are all connected to a water supply 320. The fuel water heater has an output which is coupled to a fuel heater 322 which heats the fuel which is supplied to the reformer 50 or the burner 48 the heated water from the fuel heater is typically dumped or coupled to an input of the water supply 320. Thus, the burner 48 burns either supplied fuel or reformed fuel. The feedwater heater 314 is coupled to an input of the means for supplying steam 60 such as the high and low pressure boilers, 60a and 60b respectively. The final intercooler stage 316 is typically coupled to a water cooler or other suitable means of disposing of the heated water. In this system the intercooler cools the air or fluid flow thereby providing increased power output and the water which is used to cool the fluid flow is utilized to heat the fuel and heat the water entering the boilers thereby minimizing lost energy and increasing efficiency.

Figure 4:
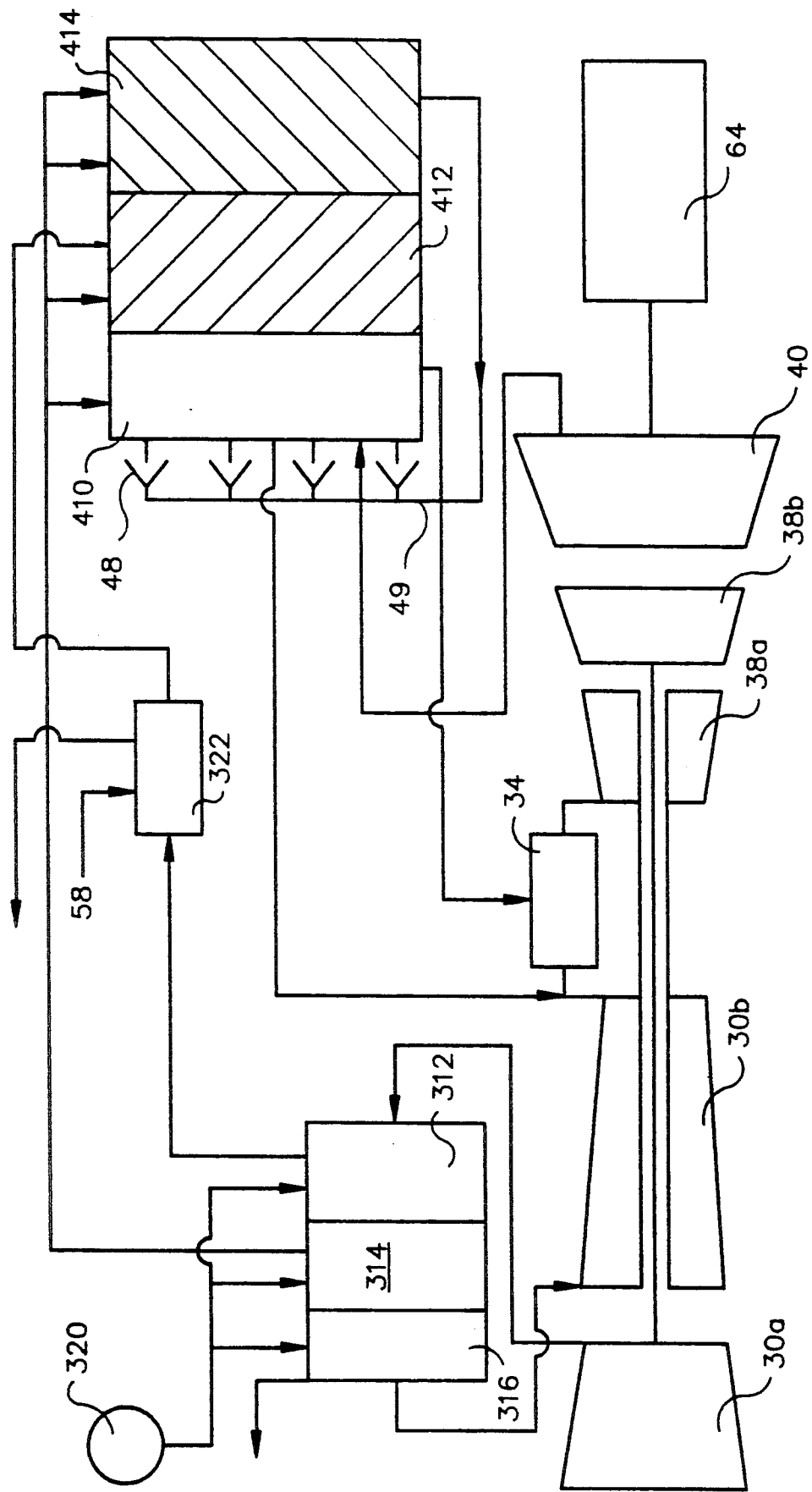

In FIG. 4 a high pressure boiler 410 is positioned downstream of the burner 48 and a high and low pressure reformer 412 and 414 respectively are positioned downstream of the high pressure boiler 410. The output of the low pressure reformer 414 is coupled to the fuel inlet 49 of the burner 48 and the output of the high pressure reformer is coupled to the combustor 34. This system provides steam cooling to the high pressure turbine and emissions control for both NOx and CO.

Figure 5:
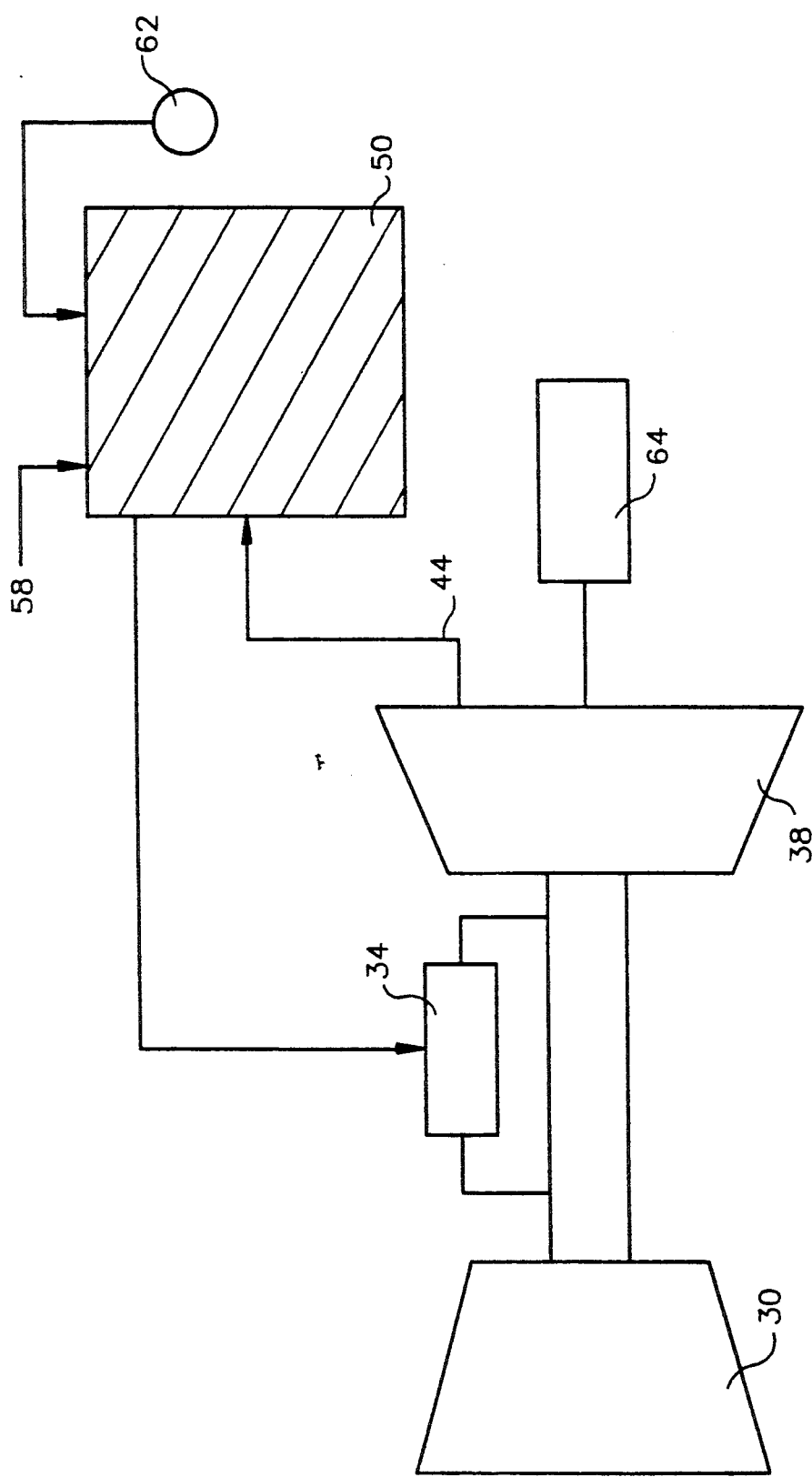

In FIG. 5 the invention is embodied in a basic configuration in which a compressor 30 is connected to the turbine 38 which is connected to the load and the output of the turbine 38 is coupled through a duct to the reformer 50. Again in this system a reheat combustor is not utilized thereby avoiding the problems associated with reheat combustor configurations. This system results from the use of a catalyst which reduces the required reformer 50 temperature, typically less than about 1150 degrees Fahrenheit, and that the output of the turbine 38 is of a sufficiently high temperature to provide the required temperature to the reformer.

Referring again to FIG. 1, in operation, the compressor 30 produces a downstream fluid flow, the combustor 34 heats the fluid flow which is then propelled through the turbine 38 which drives the compressor 30. After passing through the turbine, the fluid flow without being additionally heated also drives the power turbine 40 to provide output power and at least a portion and preferably all the fluid flow then passes through the duct 44. The fluid flow is heated immediately prior to the reformer 50 by the burner 48 and a fuel is injected into an input of the reformer 50 typically by injecting a methane fuel into an inlet and also injecting steam or water into an inlet. The reformer produces a fuel containing various constituents such as methane, carbon dioxide, water-vapor, carbon monoxide, and hydrogen. The amount of constituents produced, and in particular the amount of hydrogen desired to be produced, depends on the particular system configuration and the desired emissions output. Typically, the reformed fuel will be composed of between about 5 and 50 percent of hydrogen by volume and typically is between about 15 and 30 percent. At least a portion of the reformed fuel output of the reformer 50 is injected into the combustor 34 for combustion in the engine 20. The output of the reformer 50 may also be injected into the burner 48 for heating the fluid flow prior to the reformer 50. The fluid flow then heats the high and low pressure boilers 60a and 60b respectively, and the steam output of the boilers is injected into the engine 20 and is also preferably injected into an inlet of the reformer 50. It should be understood that for initial system start-up, typically a suitable fuel will be supplied to the combustor 34 until the system heats the reformer sufficiently such that reformed fuel may be supplied to the combustor. This system provides a system capable of producing low NOx and low CO emissions. For example in one particular design NOx emissions may be reduced to less than 8 parts per million (ppm) and less than 50 pounds per hour for CO emissions. Further, by integrating various components into an overall system, the present system obtains these low emissions with minimal negative impact on efficiency. It should be understood that typically duct firing reduces efficiency since fuel is consumed by the burner. However, chemical recuperation increases cycle efficiency, and therefore even when the burner is utilized the efficiency enhancements obtained through chemical recuperation will at least offset a portion of any efficiency reduction and the system may provide an overall increase in efficiency. Additionally this system may be incorporated into existing engines without significant modifications. In contrast, previous systems proposed for reheat combustion in front of power turbines have required the use of reheat combustors which expose the system to high thermal stresses and involve advanced technology requiring power turbines with advanced cooling techniques which are not conventionally available. However, the addition of an additional heating means downstream of the power turbine which heats the reformer 50, such as the burner, provides any additional heat necessary for the reforming process of the fuel to take place. By elimination of the reheat combustor in front of the power turbine, the system of the present invention may utilize conventional power turbines and other proven, conventionally available equipment into an overall system configuration to provide a reliable technique which avoids costly, unproven technology as required in systems using reheat combustors in front of power turbines.

It should be understood that the present invention is applicable to a variety of configurations ranging from basic systems having a single turbine in which the reformer is coupled to the output of the turbine to complex systems having multiple turbines, compressors, reformers, boilers, intercoolers, and power turbines. It is therefore, to be understood that the appended claims are intended to cover all such modifications and changes as fall within the true spirit of the invention.

We claim

1. A powerplant, comprising:
   a gas turbine engine having a compressor for producing a downstream fluid flow, a combustor downstream of the compressor, a turbine downstream of the combustor drivingly connected to said compressor by means of a shafting arrangement, and a power turbine downstream and adjacent the turbine there being no reheating means between the turbine and power turbine;
   a reformer positioned downstream of the power turbine such that the output of the power turbine provides a first means for heating the reformer, said reformer having an output which is coupled to said combustor;
   a second means for heating said reformer, said second heating means positioned downstream of said power turbine.

2. The powerplant of claim 1, said first heating means further comprising a duct positioned downstream of said power turbine, wherein a first end of said duct is coupled to the output of the power turbine and a second end of said duct is coupled to said reformer.

3. The powerplant of claim 2, wherein said second heating means comprises a burner positioned in said duct adjacent said reformer.

4. The powerplant of claim 1 further comprising a means for producing steam which is positioned downstream of said reformer wherein the output of said means for producing steam is coupled to an input of said reformer.

5. The powerplant of claim 4 wherein the output of said means for producing steam is coupled to said combustor.

6. The powerplant of claim 4 wherein the output of said means for producing steam is coupled to said turbine.

7. The powerplant of claim 4 wherein said means for producing steam comprises a first boiler for producing steam of a first pressure and a second boiler for producing steam of a pressure lower than said first pressure.

8. The powerplant of claim 7 wherein said turbine comprises a high pressure turbine and a low pressure turbine and an output of said first boiler is coupled to said combustor and an output of said second boiler is coupled to said low pressure turbine.

9. The powerplant of claim 1 wherein the only output of said reformer is coupled directly to said combustor.

10. A powerplant, comprising:
a compressor for producing a downstream fluid flow;
a combustor downstream of the compressor;
a turbine downstream of the compressor;
a duct region having a first end which receives at least a portion of the fluid output of the turbine;
a burner positioned within said duct region; and
a reformer positioned downstream of the burner and coupled to a second end of said duct region, said reformer having an output coupled to said combustor, said power plant further comprising a boiler positioned upstream of the reformer.

11. The powerplant of claim 10 wherein said output of said reformer is coupled to said burner.

12. The powerplant of claim 11 wherein said output of said reformer is also coupled to said combustor.

13. The powerplant of claim 10 wherein an output of said boiler is coupled to said combustor.

14. The powerplant of claim 1, wherein said second heating means raises the temperature of the power turbine output between approximately 250 to 600 degrees Fahrenheit.

15. The powerplant of claim 10, wherein said burner raises the temperature of said turbine fluid output between approximately 250 to 600 degrees Fahrenheit.

16. The powerplant of claim 10, further comprising a high pressure boiler positioned between said burner and said reformer, wherein said reformer is comprised of a low pressure reformer and a high pressure reformer, the output of the low pressure reformer being coupled to said burner and the output of the high pressure reformer being coupled to said combustor.

17. The powerplant of claim 1, further comprising means for injecting fuel into an input of said reformer, wherein the output of said reformer provides reformed fuel to said combustor.

18. The powerplant of claim 1, wherein
said compressor comprises a low pressure compressor and a high pressure compressor positioned downstream thereof;
said turbine comprises a low pressure turbine drivingly connected to said low pressure compressor by means of a first shaft and a high pressure turbine drivingly connected to said high pressure compressor by means of a second shaft;
further including an intercooler positioned between said low and high pressure compressors which cools the fluid flow therebetween, said intercooler further comprising means for heating fuel supplied to said reformer.

19. The powerplant of claim 21, further including a means for producing steam positioned downstream of said reformer wherein the output of said steam producing means is coupled to an input of said reformer, said intercooler further comprising means for heating water supplied to said steam producing means.

20. The powerplant of claim 10, wherein said output of said reformer is also coupled to said burner.

21. A powerplant, comprising:
a gas turbine engine having a compressor for producing a downstream fluid flow, a combustor downstream of the compressor, a turbine downstream of the combustor, and a power turbine downstream and adjacent the turbine there being no reheating means between the turbine and power turbine;
a reformer which is positioned downstream of the power turbine such that the output of the power turbine provides a first means for heating the reformer; and
a second means for heating said reformer, said second means positioned downstream of said power turbine, wherein said reformer has an output coupled to said second heating means.

* * * * *